Dec. 29, 1959  L. BLOCH  2,918,959
EYEGLASS CASE
Filed May 7, 1957
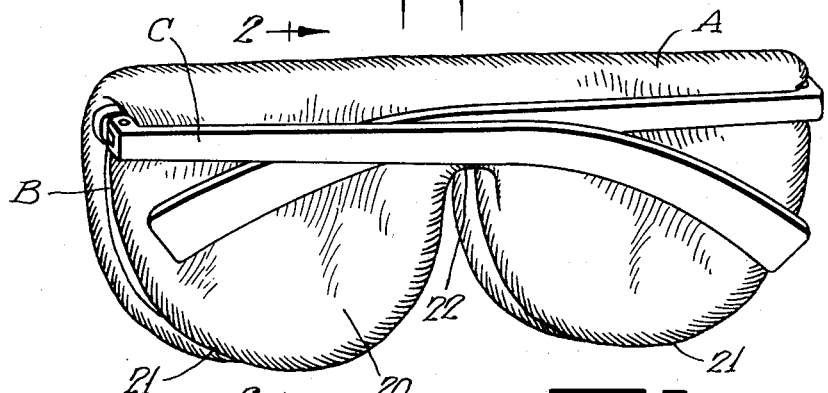
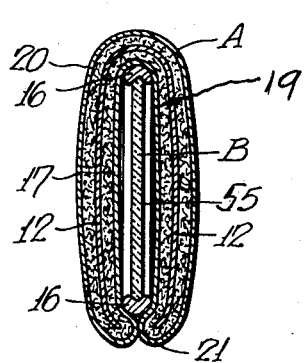
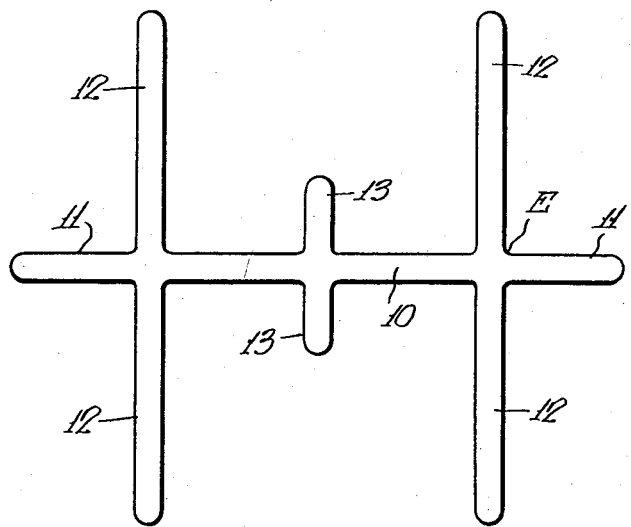
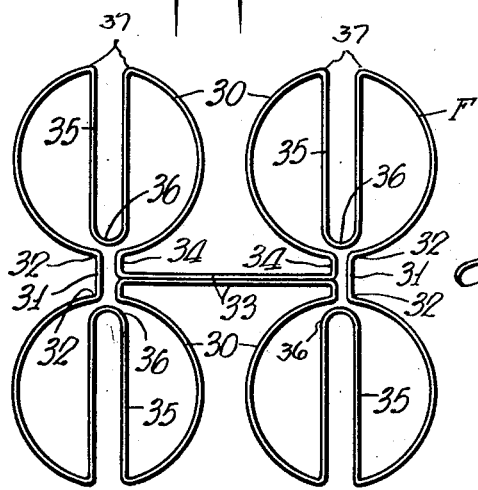
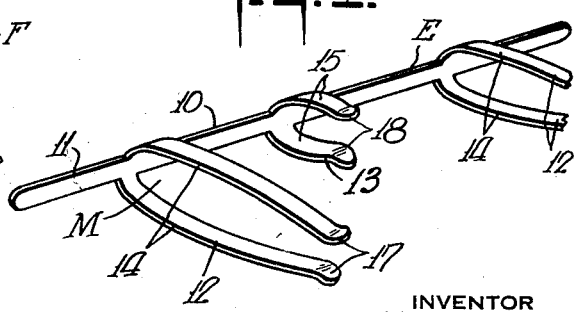
INVENTOR
*Lilli Bloch*
BY
ATTORNEY

United States Patent Office 2,918,959
Patented Dec. 29, 1959

2,918,959

EYEGLASS CASE

Lilli Bloch, New York, N.Y.

Application May 7, 1957, Serial No. 657,685

6 Claims. (Cl. 150—52)

The present invention relates to an eyeglass case and it particularly relates to an eyeglass case which may be employed in compactly carrying eyeglasses of various shapes and forms.

It is among the objects of the present invention to provide an eyeglass receptacle in which the glasses will be held against breakage and damage, with a minimum of bulk and volume and with a minimum weight on the part of the enclosure or receptacle for the eyeglasses.

Another object of the present invention is to provide an eyeglass receptacle in which the glasses may be conveniently slid or removed from the receptacle without the necessity of providing heavy spring hinge containers or flexible envelopes, and it at the same time will assure protection to the lenses and prevent pressure being put on the lenses either to project them from their position or to damage their connections with the side ear pieces.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the objects of the present invention, it is found suitable, according to one embodiment of the invention, to insert the glasses in an enclosure, which will consist of a spring clamp or clasp which will be supported and contact the periphery or frames of the glasses without affecting the lenses, and at the same time hold them firmly and securely in position.

In the preferred form, a spring clasp or clip member is provided having legs or arms corresponding to the side frames and nose piece which is usually designed to hold each securely and resiliently in position.

The spring clip may be formed of a strip of metal with spring members to grasp the frames as well as the nose piece, or a resilient wire may be provided to engage the frames and form a circular or semi-circular support and enclosure therefor.

The clasp or clip member may also be made of plastic resilient strips or bars.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a side perspective view of one form of casing or enclosure according to the present invention.

Fig. 2 is a transverse vertical sectional view upon the line 2—2 of Fig. 1.

Fig. 3 is a plan view of one form of the construction which may be folded into the casing.

Fig. 4 is the casing which may be folded from the initial frame of Fig. 3.

Fig. 5 is a plan view of a wire spring frame which also may be folded into a receptacle, as shown in Fig. 4, to form an enclosure such as indicated in Figs. 1 and 2.

Referring to Fig. 1, there is shown an enclosure A receiving the glass frame B, with the ear or temple member C being folded on the outside of the enclosure. The enclosure may consist of a spring frame member, such as indicated at E or at F.

The frame at E may be folded into the shape as indicated at Fig. 4, as may also the frame F at Fig. 5.

Referring particularly to Figs. 3 and 4, the frame desirably has a main longitudinal backbone structure 10 which forms the main backbone of the frame and enclosure of Figs. 1 and 2.

The backbone structure 10 has the end extensions 11 and the outwardly extending fingers or arms 12 to receive the circular portions of the frame, and the short fingers or extensions 13 to receive the nose piece portion of the frame. When these fingers or extensions 12 and 13 are folded together as indicated in Fig. 4, they are bulged apart, as indicated at 14, so that the glass indicated at 55 in Fig. 2 will not be subject to any pressure and so that the grasping will be done at the frame members 16.

The ends may be turned outwardly as indicated at 17, so as to permit easier insertion of the glasses. The bridge elements 13 also may have out-turned portions, as indicated at 18, to enable the nose piece to be inserted more readily in position.

This frame is provided with interior flannel covering 19 and an exterior fabric covering 20, and it is shaped to the form of the glasses, having enlargements 21 and a recess portion at 22.

It will be noted that when the eyeglasses are in position, as indicated at Figs. 1 and 2, they will be tightly and securely clasped, in the bulge portions 14 and 15 between the fingers 12 and 13, without there being any pressure on the lens 55 and with the presure all being exerted on the frame elements 16. The eyeglasses will thus be held securely in position with the temple members C being folded on the outside, as indicated in Fig. 1.

The temple members C need not be enclosed, since they are not readily subject to damage or breakage, and they may readily be positioned on the outside of the enclosure A.

The frame member of Fig. 5 is formed of resilient spring wire and has the opposite circular members 30 which are joined together at the cross members 31 at their inner portions 32. The opposite circular frames are also joined together by the double cross wires 33, which extend between the neck portions 34. The double wires 33 will form the skeleton backbone corresponding to the backbone 10 of the frame structure of Figs. 3 and 4. The double wires 33 may receive a bridge engaging portion similar to the fingers 15 of Fig. 4.

The circular elements 30 will extend around or outside of the rims 16 and will not contact the lens 55.

To reinforce the structure, it may also be desirable to have the elongated U-shaped elements 35 which may extend to the points 36, adjacent the necks 31 and 34. These elements may be positioned outside of the planes of the circles 30, and they will tie rigidly to the entire structure.

If desired, they may also be formed, as are the fingers 12 and 13 of Figs. 3 and 4, to enhance the resilient grasping quality of the eyeglass receptacle.

The structure as shown in Figs. 3 and 5 may be covered with plastic, leather or fabric or coated to serve as a lining and outside cover, with the lining preferably being of a softer, non-abrasive type material like chamois and the interior may be treated or impregnated with a silicone or other material to keep the lens clear and dustproof and prevent scratching or marring thereof.

Then the frames of Figs. 3 and 5 after folding into a casing by a suitable method or means are given the shape as indicated in Figs. 2 and 4, with a recess M adjacent the bridge or backbone 10 and the out-turned ends 17 and 18 of the fingers 12 and 13 readily engaging the eyeglass or spectacle frames and nose bridge portions.

The frames of Figs. 3 and 5 may be made in one piece or of several pieces soldered or welded together and the frame of Fig. 3 may be made of wire as well as of strip metal.

Less preferably the frames of Figs. 3 and 5 may be covered after being folded into shape, as shown in Figs. 1, 2 and 4.

The backbone or base elements 10 and 33 are desirably of heavier material, such as strip metal or plastic material, while the outside portions 12, 13 and F may be of lighter weight or wire material.

The frame of Fig. 5 may be folded into shape to provide a receptacle frame as shown in Fig. 4.

The receptacle may be readily slipped onto the glasses by one hand without difficulty with or without folding the temple members.

It is thus apparent that the applicant has provided a simple, compact and unusual eyeglass receptacle which may be conveniently carried in a pocketbook or in a pocket without the bulk of the standard type of enclosure and without the danger which results in connection with the non-rigid type of flexible envelopes which permit the glass elements to be pressed out of position in the frames.

As many changes could be made in the above eyeglass case, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A compact eyeglass enclosure to retain the frames of the glasses while protecting the glass elements against pressure and abrasion, comprising a resilient receptacle formed of a U-cross section envelope enclosure consisting of an interior integral metal skeleton with a longitudinal elongated relatively stiff rigid backbone positioned at the fold of the U-cross section envelope and having outwardly and parallelly extending rib-like parallel spring elements to engage the frames and a non-abrasive covering for the inside and outside of said receptacle.

2. A compact eyeglass enclosure to retain the frames of the glasses while protecting the glass elements against pressure and abrasion, comprising a resilient receptacle having having parallel spring elements to engage the frames and a non-abrasive covering for the inside and outside of said receptacle, said receptacle having a backbone structure following a longitudinal support element and a plurality of outwardly extending spring fingers attached thereto, said enclosure being formed of a U-cross section envelope in which said spring fingers form a metal skeleton and extend upwardly and parallel from the base of the enclosure.

3. A compact eyeglass enclosure to retain the frames of the glasses while protecting the glass elements against pressure and abrasion, comprising a resilient receptacle having parallel spring elements to engage the frames and a non-abrasive covering for the inside and outside of said receptacle, said enclosure having a plurality of bulged outwardly extending spring finger elements to engage the frames without contacting the glass elements, said enclosure being formed of a U-cross section envelope in which said spring fingers form a metal skeleton and extend upwardly and parallel from the base of the enclosure.

4. A compact eyeglass enclosure to retain the frames of the glasses while protecting the glass elements against pressure and abrasion, comprising a resilient receptacle formed of a U-cross section envelope enclosure consisting of an interior integral metal skeleton with a longitudinal elongated relatively stiff rigid backbone positioned at the fold of the U-cross section envelope and having outwardly and parallelly extending rib-like parallel spring elements to engage the frames and a non-abrasive covering for the inside and outside of said receptacle, said inside covering carrying a lens-polishing compound.

5. A flat compact U-cross section eyeglass receptacle receiving and holding the lens structures, while the temple portions are folded on the exterior of the receptacle, said receptacle having an interior metal skeleton with a stiff longitudinally extending metal backbone at the bend of the U and parallelly outwardly extending resilient metal ribs engaging the lens structures.

6. The receptacle of claim 5, said metal backbone being formed from an integral metal member with the ribs being bent from the backbone to an angle of 90° so that they will extend transversely away from said backbone after having originally been positioned in the plane of said backbone.

References Cited in the file of this patent

UNITED STATES PATENTS

| | | |
|---|---|---|
| 2,650,701 | Parsell | Sept. 1, 1953 |
| 2,762,500 | Parsell | Sept. 11, 1956 |

FOREIGN PATENTS

| | | |
|---|---|---|
| 333,268 | Germany | Feb. 21, 1921 |
| 420,114 | Great Britain | Nov. 26, 1934 |